United States Patent [19]

Stanley, Jr. et al.

[11] 4,390,659

[45] Jun. 28, 1983

[54] METHOD FOR THE PREPARATION OF QUATERNARY CARBOXAMIDE POLYMERS

[75] Inventors: Frederick W. Stanley, Jr.; William J. Fairchok, both of Midland, Mich.

[73] Assignee: The Dow Chemical Company, Midland, Mich.

[21] Appl. No.: 158,095

[22] Filed: Jun. 10, 1980

[51] Int. Cl.³ ............................................. C08L 61/32
[52] U.S. Cl. .................................. 524/555; 524/827; 525/157; 525/329.4; 525/379
[58] Field of Search ................... 525/157, 336, 329.4, 525/379; 524/555, 827; 260/29.4 UA; 526/303

[56] References Cited

U.S. PATENT DOCUMENTS

| | | | |
|---|---|---|---|
| 4,010,131 | 3/1977 | Phillips et al. | 260/29.4 UA |
| 4,049,606 | 9/1977 | Hunter et al. | 260/29.4 UA |
| 4,057,533 | 11/1977 | Hort et al. | 260/67.5 |
| 4,179,424 | 12/1979 | Phillips et al. | 260/29.4 UA |

FOREIGN PATENT DOCUMENTS 1373034 11/1974 United Kingdom .
1489046 10/1977 United Kingdom .

*Primary Examiner*—Theodore E. Pertilla

[57] ABSTRACT

Quaternary carboxamide polymers such as N-(triethylammonium ethyl)acrylamide chloride are prepared by simultaneously contacting a carboxamide polymer with an aldehyde such as formaldehyde, a secondary amine such as dimethylamine and a quaternizing agent such as methyl chloride. By such method, quaternary carboxamide polymers useful in a variety of applications such as emulsion breaking and water clarification are readily prepared.

13 Claims, No Drawings

METHOD FOR THE PREPARATION OF QUATERNARY CARBOXAMIDE POLYMERS

BACKGROUND OF THE INVENTION

This invention relates to a method for preparing a N-substituted carboxamide polymer, particularly to a method for preparing a quaternized, N-substituted carboxamide polymer.

Quaternized, N-substituted carboxamide polymers are known to be effective thickeners and flocculating agents in aqueous solutions. Accordingly, the quaternary carboxamide polymers are useful in the clarification of aqueous systems, in paper making operations, in the treatment of sewage and industrial wastes, and as stabilizers for drilling muds and enhanced oil drilling operations.

Heretofore, quaternary carboxamide polymers have been prepared by a variety of methods. For example, in one prior art method, a carboxamide polymer is initially aminomethylated using formaldehyde and a secondary amine and, the aminomethylated polymer subsequently contacted with an alkylating agent such as dimethyl sulfate or methyl chloride. See, for example, British Pat. Nos. 1,373,034 and 1,489,046. Unfortunately, preparation of quaternary carboxamide polymers by such methods requires extended reaction times and/or elevated temperatures. As such, substantial amounts of time, capital and energy are required to obtain the desired yields of the quaternary polymers. U.S. Pat. No. 4,049,606 reports higher yields can be obtained by maintaining the pH of the reaction mixture at a first, slightly acidic, pH during the aminomethylation reaction step and at a second, slightly basic, pH during the quaternization reaction step. Unfortunately, the disclosed procedure requires careful control of reaction conditions, e.g., regulation of pH and temperatures to achieve such higher yields.

Alternatively, quaternary carboxamide polymers can also be prepared by reacting the polymer with the previously prepared reaction product of a secondary amine and an aldehyde followed by the quaternization of the polymer using an alkylating agent. See, for example, U.S. Pat. No. 4,010,131. Unfortunately, said method does not substantially reduce the amounts of time, capital and energy required for the preparation of the quaternary polymer. Moreover, said method requires the preliminary formation and isolation of the fairly toxic aldehyde-amine adduct.

In view of the aforementioned deficiencies of the prior art methods for preparing quaternary derivatives of carboxamide polymers, it would be highly desirable to provide a more efficient method for preparing carboxamide polymers.

SUMMARY OF THE INVENTION

Accordingly, the present invention is a method for preparing a quaternary carboxamide polymer. The method comprises simultaneously contacting a carboxamide polymer with a lower aldehyde and an amine or the reaction product thereof, and a quaternizing agent at conditions sufficient to prepare a N-[tri(hydrocarbyl or inertly substituted hydrocarbyl)ammonium alkyl]-carboxamide polymer. By the term "simultaneously contacting" it is meant that the carboxamide polymer is contacted with the amine and aldehyde or their reaction product, and at least a portion of the quaternizing agent, prior to the substantial reaction of the carboxamide polymer with the amine, aldehyde or their reaction product.

Surprisingly, the carboxamide polymer is effectively quaternized by the method of this invention without the expected formation of substantial amounts of unreactive by-products such as a tetraalkyl ammonium salt, e.g., tetramethyl ammonium chloride. In many cases, at least about 80 mole percent of the carboxamide polymer, based on the moles of carboxamide groups (moieties) in the carboxamide polymers, is reacted with the amine, aldehyde (or their reaction product) and the quaternizing agent to form N-(trihydrocarbyl ammonium alkyl)-carboxamide groups. Moreover, using the method of this invention, as the quaternary carboxamide polymer is prepared in a single step, the preparation of the quaternary polymer is achieved using less expenditures of time, temperature or capital than the prior art methods.

The quaternary carboxamide polymers prepared by the method of this invention are usefully employed in a wide variety of applications such as the flocculation of dispersed particulate solids from an aqueous suspension, including sewage and effluent from industrial mining and paper manufacturing operations.

DETAILED DESCRIPTION OF ILLUSTRATIVE EMBODIMENTS

The carboxamide polymers suitably employed in the practice of the present invention are polymers of an ethylenically unsaturated carboxamide monomer such as acrylamide, methacrylamide, fumaramide, ethacrylamide or the like, which polymers are at least inherently water-dispersible, i.e., can be dispersed in water to form a stable dispersion without the aid of a surfactant, and preferably, form at least a 1 weight percent solution when dispersed in an aqueous liquid, including aqueous acid or aqueous base. Such polymers can be homopolymers of the ethylenically unsaturated carboxamide monomer or a copolymer of one or more carboxamide monomer with one or more other ethylenically unsaturated monomers copolymerizable therewith. Examples of such other monomeric compounds are water-soluble comonomers including ethylenically unsaturated cationic monomers such as the aminoalkyl esters of unsaturated carboxylic acids, e.g., 2-aminoethyl methacrylate, and ethylenically unsaturated sulfonium compounds; nonionic water-soluble comonomers such as vinyl esters of saturated carboxylic acids, e.g., vinyl acetate and vinyl propionate; ethylenically unsaturated anionic monomers such as ethylenically unsaturated carboxylic acids and anhydrides, e.g., acrylic acid, methacrylic acid and maleic anhydride, and ethylenically unsaturated sulfonic acids such as vinylbenzyl sulfonic acid; and similar water-soluble monomers. In addition to the water-soluble monomers, the carboxamide polymer may contain up to about 15 mole percent of a copolymerizable, water-insoluble, ethylenically unsaturated monomer such as a monovinylidene aromatic, e.g., styrene; a vinyl halide, e.g., vinyl chloride and vinylidene chloride; and esters of ethylenically unsaturated acids such as alkyl acrylates and methacrylates.

Preferably, the carboxamide polymer is a polymer of an ethylenically unsaturated carboxamide wherein at least about 10, more preferably at least about 90, mole percent of the polymerized monomer units have pendant carboxamide groups wherein a carboxamide group (moiety) is represented by the formula:

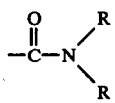

(I)

wherein each R is individually hydrogen, alkyl or hydroxyalkyl provided at least one R is hydrogen. The carboxamide polymer is more preferably a homopolymer or copolymer of acrylamide or methacrylamide, with a homopolymer of acrylamide or a copolymer of at least about 85 mole percent of polymerized acrylamide being especially preferred.

The molecular weight of the carboxamide polymer is not particularly critical and may vary over a wide range from about 10,000 to over 25,000,000. Preferred carboxamide polymers have weight average molecular weights in excess of 500,000, most preferably in excess of 1,000,000.

The carboxamide polymers useful herein can be prepared as an aqueous solution of the carboxamide polymer or as a water-in-oil emulsion of the carboxamide polymer wherein the disperse phase is an aqueous phase containing the carboxamide polymer and the continuous phase is a water-immiscible, inert liquid.

An aqueous solution of the carboxamide polymers is prepared by conventional techniques well known in the art, which techniques are hereby incorporated by reference. Typically, using such techniques, the carboxamide monomer(s), including any other monomers to be copolymerized therewith, is polymerized in an aqueous liquid using free-radical initiation, preferably a redox-type free-radical initiator such as tertiary butyl hydroperoxide and sodium bisulfite. A chain transfer agent, e.g., isopropanol, is optionally employed, particularly in the preparation of lower molecular weight polymers. Although the solution can be prepared over a wide range of concentrations, e.g., can comprise from about 0.1 to about 50 weight percent polymer, the desired concentration is determined primarily by the molecular weight of the polymer. In general, at the preferred molecular weights, the solution generally will advantageously comprise from about 3 to about 20 weight percent polymer.

Water-in-oil emulsions of the carboxamide polymer are also advantageously prepared by any of the conventional techniques well known in the art. Illustrative of such techniques are U.S. Pat. Nos. 3,284,393; 3,624,019 and 3,734,873; all of which are hereby incorporated by reference. Preferably, the water-in-oil emulsion is prepared by the polymerization techniques of U.S. Pat. No. 3,284,393. In said method, an aqueous solution of the carboxamide monomer(s) and the monomers to be copolymerized therewith, is dispersed in an inert, hydrophobic liquid organic dispersing medium containing a sufficient amount of a water-in-oil emulsifying agent and the resulting emulsion is then heated under free-radical forming conditions to polymerize the monomer in the disperse phase to form the desired water-in-oil emulsion.

Suitable emulsifying agents are those agents which enable the formation of a water-in-oil emulsion and which are not reacted or destroyed during the subsequent reaction of the carboxamide polymer with the aldehyde and amine or the reaction product thereof, and the quaternizing agent. In general, the emulsifying agents are nonionic or anionic and permit the inversion of the water-in-oil emulsion to an oil-in-water emulsion upon the addition of sufficient amounts of an aqueous liquid and an inverting surfactant to the emulsion. The hydrophobic-lipophobic balance (HLB) of the emulsifying agent is preferably from about 1 to about 12, more preferably from about 3 to about 9. Examples of such emulsifying agents are the amide reaction product of oleic acid with isopropanolamine, hexadecyl sodium phthalate, cetyl sodium phthalate, octadecyl sodium phthalate, sorbitan monooleate, sorbitan stearate, glycerine mono- or distearate and mixtures thereof. Preferred of such emulsifying agents are sodium monooleate and the amide reaction product of oleic acid with isopropanolamine. Generally, the emulsifier is used in an amount sufficient to provide for the water-in-oil emulsion. Such amount is generally within the range of from about 0.1 to about 25, preferably from about 1.5 to about 6, weight percent based on the weight of the aqueous phase.

The water-immiscible, inert organic liquids useful as the continuous phase in the water-in-oil emulsions of the carboxamide polymers are inert, hydrophobic, organic liquids which can be used in the preparation of a water-in-oil emulsion. In general, such organic liquids are liquid hydrocarbons or substituted hydrocarbons. Advantageously, such organic liquids are halogenated hydrocarbon liquids, e.g., perchloroethylene and methylene chloride, and liquid hydrocarbons, preferably having from about 4 to about 15 carbon atoms, including aromatic and aliphatic hydrocarbons or mixtures thereof such as benzene, xylene, toluene, mineral oils and liquid paraffins, e.g., kerosene and naphtha. Of such liquids, the hydrocarbons are especially preferred.

Advantageously, the amounts of the oil phase and aqueous phase in the water-in-oil emulsion are suitably those amounts which permit the formation of the water-in-oil emulsion. The amounts of each phase most advantageously employed will vary depending on a variety of factors including the oil and polymer employed, the composition of the aqueous phase, i.e., the ratio of polymer to water, and the desired end use application. In general, the disperse aqueous phase will advantageously constitute from about 30 to about 95, more preferably from about 45 to about 85, most preferably from about 65 to about 75, volume percent of the total volume of the oil-in-water emulsion. The continuous oil phase advantageously constitutes from about 70 to about 5, more preferably from about 55 to about 15, most preferably from about 35 to about 25, volume percent of the total volume of the emulsion.

The amounts of the carboxamide polymer and water in the aqueous phase are dependent on many factors including the specific polymer and the desired end use application. In general, the concentration of the carboxamide polymer is at least about one weight percent based on the total weight of the aqueous phase, but less than an amount that would appreciably destabilize the emulsion. Advantageously, the polymer constitutes less than about 90 weight percent of the disperse aqueous phase. Preferably, the polymer in the aqueous phase constitutes from about 3 to about 60, more preferably from about 30 to about 55, weight percent of the total weight of the aqueous phase, i.e., the total weight of water and polymer.

The other reactants suitably employed herein are those amines, aldehydes and quaternizing agents which are capable of reacting with the pendant carboxamide groups of the carboxamide polymer to form the desired N-[tri(hydrocarbyl or inertly substituted hydrocarbyl)]ammonium alkyl]carboxamide polymer. In general, the amines, lower aldehydes and quaternizing agents employed heretofore in the preparation of quaternary carboxamide polymers are useful herein.

Advantageously, the amines employed in the practice of this invention are secondary amines which amines are dispersible in the reaction medium at the conditions employed to prepare the quaternary polymer. Preferably, the amines are soluble in water, i.e., they form at least about a 10, advantageously from about a 30 to about a 40, weight percent aqueous solution. Of particular interest are secondary amines represented by the formula:

$$HN(R')_2 \qquad (II)$$

wherein each R' is individually hydrocarbyl such as alkyl, cycloalkyl, alkenyl, aryl or aralkyl or an inertly substituted hydrocarbyl. By "hydrocarbyl" it is meant a monovalent hydrocarbon radical. An inertly substituted hydrocarbyl is a hydrocarbyl bearing a substituent group or having a group in the hydrocarbyl chain, said groups being inert in the formation of the quaternary polymer. Examples of inertly substituted groups are hydroxyalkyl, aminoalkyl, sulfoalkyl wherein the sulfo is in acid or salt form, carboxyalkyl wherein the carboxy is in acid or salt form, or cyanoalkyl. Alternatively, the R' groups are collectively alkylene, alkenylene or other divalent hydrocarbon radicals or inertly substituted divalent radicals which when taken with the amino nitrogen, forms a heterocyclic ring, preferably having 5 or 6 members. Preferably, R' is an alkyl, particularly a lower alkyl having from 1 to about 8 carbon atoms; hydroxyalkyl, particularly those having from 2 to 4 carbon atoms; or alkenyl having from 3 to about 8 carbon atoms. Exemplarly amines include dimethylamine, methyl ethylamine, hydroxyethyl methylamine, dibutylamine, piperidine, morpholine, pyrrolidene, diethanolamine, diallylamine, N-methylaminoethane sulfonic acid, 2-aminopropionitrile and 2-[(β-methylamino)-ethyl] pyridine. Of such amines, the dialkylamines, particularly diethylamine and dimethylamine, are most preferred. The amine is preferably employed in the form of an aqueous solution containing from about 10 to about 40, preferably from about 30 to about 40, weight percent amine.

As employed herein, the term "lower aldehyde" refers to aldehydes having 1 to 3 carbon atoms and materials which generate such lower aldehydes under the conditions of the method of this invention. Examples of aldehydes include formaldehyde, acetaldehyde and propionaldehyde. Examples of materials containing or having the capability of generating aldehydes include paraformaldehyde and trioxane. The preferred aldehyde is formaldehyde, which is advantageously employed as an aqueous solution containing from about 18 to about 60, more preferably from about 30 to about 55, weight percent formaldehyde.

A reaction product of the aldehyde and the amine, commonly referred to as the "aldehyde-amine adduct," can be employed herein as a total or partial replacement for the amine and aldehyde. Such aldehydeamine adducts are prepared by conventional techniques well known in the art. In general, such techniques involve mixing the formaldehyde, preferably in the form of an aqueous solution, with the amine, preferably in the form of an aqueous solution, at temperatures ranging from about 20° to 80° C.

Quaternizing agents advantageously employed herein are those materials which are capable of quaternizing the Mannich reaction product of a carboxamide polymer. Typically, such quaternizing agents include alkyl or aryl halides and dialkyl sulfates such as dimethyl sulfate. Preferred quaternizing agents are the lower alkyl halides having from 1 to about 4 carbon atoms such as methyl chloride, ethyl chloride, propyl chloride, methyl bromide and methyl iodide; with methyl chloride and methyl bromide being particularly preferred.

The amounts of each reactant, i.e., the carboxamide polymer, amine, aldehyde and quaternizing agent, are not particularly critical in the practice of this invention and those amounts most advantageously employed herein will vary depending on the specific carboxamide polymer, aldehyde, amine and quaternizing agent and the conditions of quaterization. Typically, from about 0.9 to about 1.7, more preferably from about 1 to about 1.25, moles of aldehyde; from about 1 to about 1.8, preferably from about 1.1 to about 1.3, moles of amine and from about 1.2 to about 2.0, preferably from about 1.4 to about 1.7, moles of the quaternizing agent are employed per mole of carboxamide moiety (groups) in the carboxamide polymer. If employed, from about 0.9 to about 1.7, more preferably from 1 to about 1.25, moles of the aldehyde-amine adduct are employed per mole of carboxamide moiety. In carrying out the reaction, it is desirable to employ an excess of the quaternizing agent to amine on a mole basis and an excess of amine to aldehyde on a mole basis. Advantageously, from about 1.1 to about 1.8, preferably from about 1.3 to about 1.7, moles of quaternizing agent are employed per mole of amine and from about 0.9 to about 2, preferably from about 1.05 to about 1.3, moles of amine are employed per mole of aldehyde.

In conducting the reaction to form the desired quaternary carboxamide polymer, the carboxamide polymer is simultaneously contacted with the amine, aldehyde or their reaction product and the quaternizing agent at conditions sufficient to form the desired N-[tri(hydrocarbyl or inertly substituted hydrocarbyl)ammonium alkyl]carboxamide. The order of addition of the reactants is not particularly critical to the practice of this invention provided that the carboxamide polymer is contacted with the lower aldehyde, the amine and at least a portion (i.e., a measurable amount) of the quaternizing agent prior to the substantial reaction of the carboxamide polymer with the reactants, which reaction, in general, will initially constitute the reaction of the carboxamide polymer with the aldehyde or aldehyde-amine adduct. By the term "substantial reaction of the carboxamide polymer" it is meant that less than about 50 mole percent of the reactive carboxamide groups pendant from the polymer is reacted with the aldehyde, amine or the adduct thereof prior to the contact of the polymer with a measurable amount of the quaternizing agent. Advantageously, less than about 20, preferably less than about 10, more preferably less than about 5, mole percent of the reactive carboxamide groups are so reacted prior to the polymer's contact with a portion of the quaternizing agent.

While the quaternizing agent can be added prior to or coincidentally with the aldehyde and amine or the adduct thereof, it is advantageously added to the reaction mixture following the addition of the aldehyde and amine (which reactants are advantageously added simultaneously) or their adduct. The addition of normally liquid quaternizing agents such as dimethyl sulfate can be batchwise, continuous or incremental, i.e., added as shots in two or more increments, with continuous addition being preferred to control the temperature of the reaction mixture. Various quaternizing agents, e.g., methyl chloride, are normally gaseous materials and the quaternization reaction requires the prior diffusion of the quaternizing agent into the liquid containing the carboxamide polymer. While such quaternizing agents can be added in a batchwise manner, to prevent excessive pressure build-up in the reaction vessel and/or to prevent the inversion of a water-in-oil emulsion of the carboxamide polymer, the gaseous quaternizing agents are advantageously added to the reaction mixture over an extended period of time. Preferably, such addition consists of bubbling the quaternizing agent through the reaction mixture or adding the quaternizing agent at a rate sufficient to achieve and maintain a blanket of the quaternizing agent in the reaction vessel. For example, the quaternizing agent is advantageously added at a rate such that the pressure in the reaction vessel is maintained at from about 10 to about 50, preferably from about 30 to about 40, psig during the addition. Advantageously, the addition of the quaternizing agent is conducted at conditions such that, prior to the substantial reaction of the carboxamide polymer, at least about 10, preferably at least about 20, more preferably at least about 25, percent of the stoichiometric amount of the quaternizing agent has been added to the reaction mixture.

When contacting a water-in-oil emulsion of the carboxamide polymer with the amine, aldehyde and quaternizing agent, to prevent inversion of the emulsion which may result due to the water added with the other reactants, additional amounts of oil sufficient to prevent such inversion are often advantageously added with the other reactants. Preferably, the aqueous solutions of the amine and aldehyde or their reaction product are emulsified in the required amounts of oil and the resulting emulsion(s) added to the water-in-oil emulsion of the carboxamide polymer. In general, the oil advantageously added with the amine, aldehyde or their reaction product is that amount required to maintain the proportion of the oil phase to water phase approximately the same as prior to their addition. Additional amounts of the surfactant can also be added to help maintain the water-in-oil emulsion.

The addition of the reactants is conducted at conditions which minimize the reaction of the carboxamide polymer with the reactants until their complete addition and the temperature of the reaction medium is preferably less than about 70°, more preferably less than about 40°, most preferably from about 25° to about 30° C.

In the practice of this invention, the carboxamide polymer is advantageously quaternized at a temperature at which reaction occurs. In general, the carboxamide polymer is advantageously quaternized at a temperature from about room temperature (i.e., from about 18° to about 25° C.) to about 100° C., preferably from about 20° to about 70°, more preferably from about 25° to about 40° C. To insure complete quaternization, quaternization of the polymer is continued until the pH of the reaction medium reaches about 5 or below. During addition of the reactants and the quaternization reaction, sufficient agitation is provided to uniformly distribute the reactants, to promote the necessary diffusion of the gaseous, quaternized agent, if employed, to the liquid phase of the reaction mixture, and to provide adequate heat transfer, i.e., maintain a reasonably uniform temperature gradient throughout the reaction medium.

When prepared in the form of an aqueous solution or dispersion, the resulting quaternary carboxamide polymer is generally a viscous solution which is usable as prepared. Often, a stabilizer such as a halogen-free oxygen containing inorganic acid, e.g., sulfurous acid, may be added to adjust the pH of the solution or dispersion to from about 0 to about 6, thereby stabilizing the polymer. Alternatively, the water can be removed and a dry polymer obtained in powder form.

The water-in-oil emulsion of the quaternary carboxamide polymer obtained by the method of this invention is typically a fluid liquid which is easily poured or pumped. This emulsion is readily employed as is by adding it to an aqueous medium which inverts the emulsion to an aqueous solution of the polymer. To facilitate such inversion, it is generally desirable to employ a water-soluble surface active agent such as an alkali metal, ammonium or amine soap of a fatty acid such as lauric, oleic or a comparable acid; an alkali metal of an alkylaryl sulfonic acid or an alkyl sulfonate; a salt of a long-chain primary, secondary or tertiary amine such as oleamine acetate and cetylamine acetate or a condensation product of the fatty alcohol ethylene oxide or propylene oxide such as a polyethylene glycol monolaurate, a polyethylene glycol monostearate or a polyethylene glycol dioleate. Further examples of such inverting surfactants and methods for their use are disclosed in U.S. Pat. No. 3,624,019 which is hereby incorporated by reference.

The method of this invention can be adapted to the batchwise, semi-batchwise or continuous (i.e., steady state flow) preparation of quaternary carboxamide polymers.

The following example is given to further illustrate the invention and should not be construed to limit its scope. Unless otherwise indicated, all parts and percentages are by weight.

EXAMPLE

A 150-g portion of a water-in-oil emulsion of polyacrylamide is prepared by dispersing as droplets having an average diameter less than about 100 micrometers an aqueous phase of 64.8 g water, 43.2 g of acrylamide, 0.06 g of a 10 percent solution of the pentasodium salt of diethylenetriamine pentaacetic acid and 0.86 g of isopropanol in an oil phase of 2.16 g of the isopropanolamide of oleic acid (85 percent active) and 39.8 g of Isopar ®M (a mixture of isoparaffinic hydrocarbons having a flash point of 170° C.) and polymerizing the acrylamide in an oxygen-free atmosphere using the conditions described in U.S. Pat. No. 3,284,393.

An aldehyde-amine adduct is prepared as an emulsion by emulsifying 54.2 g of a 37 percent active formalin solution (37 percent formaldehyde, about 5 to about 10 percent methanol, with the remainder being water), 84.8 g of an aqueous solution of 40.5 percent dimethylamine, 56.8 g of Isopar ®M and 2.8 g of the isopropanolamide of oleic acid (85 percent active) in a Waring blendor. A 132.4-g portion of the resulting emulsion containing the aldehyde-amine adduct is added to a 100-g portion of the water-in-oil emulsion of the carboxamide polymer. This addition is conducted at ambient temperatures, e.g., from about 18° to about 25°

C., while mildly agitating the water-in-oil emulsion and is completed in about 5 minutes, at which time essentially none of the carboxamide polymer has reacted with the adduct.

Immediately following the addition of the aldehyde-amine adduct, 34.9 g of methyl chloride is added to the emulsion over a 6-hour period while continuously agitating the emulsion and maintaining the emulsion at a temperature of about 35° C. Following complete addition of the methyl chloride, the reaction mixture is maintained at about 35° C. under a blanket of methyl chloride for an additional 14-hour period.

The resulting quaternized product is inverted by adding an inverting surfactant, e.g., polyethylene glycol ether of a linear alcohol, and sufficient water to form an aqueous solution of about 0.13 weight percent of the quaternized polymer.

To test the effectiveness of the quaternized, carboxamide polymer as a flocculant, 60 ml of the aqueous solution of the quaternized polymer solution is added to about 200 ml of a sludge containing about 2.5 weight percent solids. The polymer-sludge mixture is moderately agitated to allow intimate contact between the polymer and the sludge. The dewatering characteristic of the resulting polymer-sludge mixture is determined by measuring the amount of liquid withdrawn from the mixture in a given period of time using conventional vacuum filtration techniques. In this invention, the polymer-sludge mixture is added to a filtering device attached to a filtrate receiver having 1 ml graduations. The filtrate receiver is attached to a vacuum source which produces a vacuum of about 381 mm of mercury. The polymer-sludge mixture is subjected to this vacuum for a period of about 60 minutes and the amount of liquid passing through the filter during this period is measured, with the greater amounts of liquid passing through the filter indicating better flocculation by the polymer. The polymer-sludge mixture comprising the quaternized polymer prepared by the method of this invention is found to yield 170 ml of liquid after 60 minutes of vacuum filtration.

For purposes of comparison, a water-in-oil emulsion of a quaternized, carboxamide polyacrylamide is prepared using conventional techniques wherein the polyacrylamide is reacted to substantial completion with the aldehyde-amine adduct prior to the addition of the quaternizing agent to the reaction medium. Employing the hereinbefore described test method, to determine the effectiveness of the quaternized polymer as a flocculant, a polymer-sludge mixture comprising the conventionally prepared polyacrylamide is found to yield about 175 ml liquid after about 60 minutes of vacuum filtration.

Thus, as determined by dewatering characteristics of the polymer-sludge mixtures, the activity of the polymer prepared by the method of this invention is approximately equal to the polymer prepared by conventional techniques, thereby indicating that there is not extensive formation of the expected but unreactive products formed by the reaction between the aldehyde, amine or their reaction product and the quaternizing agent.

What is claimed is:

1. A method for preparing a quaternary carboxamide polymer comprising the step of simultaneously contacting a carboxamide polymer with a lower aldehyde and a secondary amine or the reaction product thereof and at least a portion of a quaternizing agent prior to the substantial reaction to the carboxamide polymer with the aldehyde, secondary amine or their reaction product and at conditions sufficient to prepare a N-[tri(hydrocarbyl or inertly substituted hydrocarbyl)ammonium alkyl]-carboxamide polymer.

2. The method of claim 1 wherein less than 20 mole percent of the reactive carboxamide groups pendant from the carboxamide polymer are reacted with the aldehyde, secondary amine or the reaction product thereof prior to contacting the polymer with a measurable portion of the quaternizing agent.

3. The method of claim 1 wherein a water-in-oil emulsion of the carboxamide polymer is simultaneously contacted with the lower aldehyde, secondary amine or their reaction product and the quaternizing agent.

4. The method of claim 3 wherein the quaternizing agent is normally gaseous and sufficient amounts of the quaternizing agent are added to a reaction vessel containing the water-in-oil emulsion of the carboxamide polymer to achieve and maintain a blanket of the gaseous, quaternizing agent.

5. The method of claim 4 wherein the quaternizing agent is methyl chloride.

6. The method of claim 5 wherein the reaction is conducted at a temperature from about 20° to about 70° C. and the pressure in the reaction vessel during the addition of the methyl chloride is maintained at from about 10 to about 50 psig.

7. The method of claim 1 wherein the secondary amine is dialkylamine.

8. The method of claim 7 wherein the secondary amine is dimethylamine and the aldehyde is formaldehyde.

9. The method of claim 1 wherein from about 0.9 to about 1.7 moles of aldehyde, from about 1 to about 1.8 moles of secondary amine and from about 1.2 to about 2 moles of quaternizing agent are employed per mole of carboxamide moiety, the molar ratio of quaternizing agent to amine is about 1:1 to about 1.8:1 and the molar ratio of amine to aldehyde is about 0.9:1 to about 2:1.

10. The method of claim 9 wherein from about 1 to about 1.25 moles of formaldehyde, from about 1.1 to about 1.3 moles of dimethylamine and from about 1.4 to about 1.7 moles of methyl chloride are employed per mole of carboxamide moiety; the molar ratio of methyl chloride to dimethylamine is about 1.3:1 to about 1.7:1 and the molar ratio of dimethylamine to formaldehyde is about 1.05:1 to about 1.3:1.

11. The method of claim 1 wherein the carboxamide polymer is a homopolymer of a carboxamide monomer.

12. The method of claim 1 wherein the carboxamide polymer is derived from acrylamide.

13. The method of claim 1 wherein the carboxamide polymer contains from about 85 to about 100 mole percent of a polymerized ethylenically unsaturated carboxamide monomer.

* * * * *